US009800867B2

(12) United States Patent
Itoh et al.

(10) Patent No.: US 9,800,867 B2
(45) Date of Patent: Oct. 24, 2017

(54) CALIBRATION DEVICE OF CAMERA, CAMERA SYSTEM, AND CALIBRATION METHOD OF CAMERA

(71) Applicant: Hitachi, Ltd., Tokyo (JP)

(72) Inventors: Masaya Itoh, Tokyo (JP); So Sasatani, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/171,156

(22) Filed: Jun. 2, 2016

(65) Prior Publication Data
US 2016/0360195 A1 Dec. 8, 2016

(30) Foreign Application Priority Data

Jun. 3, 2015 (JP) ................................. 2015-113475

(51) Int. Cl.
| H04N 17/00 | (2006.01) |
| H04N 17/02 | (2006.01) |
| H04N 13/02 | (2006.01) |
| G06T 7/80 | (2017.01) |
| H04N 5/247 | (2006.01) |

(52) U.S. Cl.
CPC ............ *H04N 17/002* (2013.01); *G06T 7/80* (2017.01); *H04N 5/247* (2013.01); *H04N 13/0239* (2013.01); *H04N 13/0246* (2013.01); *G06T 2200/24* (2013.01); *G06T 2207/10012* (2013.01); *G06T 2207/20021* (2013.01); *G06T 2207/20092* (2013.01); *G06T 2207/30208* (2013.01)

(58) Field of Classification Search
USPC ... 348/180, 184, 187, 189, 191, 130, 47, 48, 348/49, 50, 64, 211.6, 222.1, 231.3, 348/231.6, 231.9, 254, 333.09, 523, 567, 348/650, 714, 719; 358/1.9, 2.1, 2.99, 358/406, 504, 518
See application file for complete search history.

(56) References Cited

U.S. PATENT DOCUMENTS

| 5,999,122 A * | 12/1999 | Shoucri ................. G01V 8/005 250/332 |
| 6,954,556 B2 * | 10/2005 | Nou ..................... H04N 1/4092 358/2.99 |
| 6,970,588 B1 * | 11/2005 | Komatsu ............. G06K 9/6253 356/237.1 |

(Continued)

FOREIGN PATENT DOCUMENTS

JP 2004-037270 A 2/2004

*Primary Examiner* — Jefferey F Harold
*Assistant Examiner* — Mustafizur Rahman
(74) *Attorney, Agent, or Firm* — Mattingly & Malur, PC

(57) ABSTRACT

To provide a calibration device of a camera, a camera system, and a calibration method of a camera which can achieve simplification of a calibration operation and improvement of accuracy of the calibration. A calibration device 2 includes a database 30, an instruction section 25, a correction section, and an evaluation section 24. Process data in accordance with a specification of a camera 11A is stored in the database 30. The instruction section 25 outputs an operation instruction to a display screen 50A based on the process data. The evaluation section 24 evaluates a correction image which is corrected by the correction section.

8 Claims, 7 Drawing Sheets

(56) References Cited

U.S. PATENT DOCUMENTS

| | | | |
|---|---|---|---|
| 8,233,001 B2* | 7/2012 | Onozawa | G09G 5/006 345/522 |
| 2001/0034014 A1* | 10/2001 | Nishimoto | G09B 19/0015 434/247 |
| 2005/0156816 A1* | 7/2005 | Repetto | G02B 27/017 345/7 |
| 2008/0118180 A1* | 5/2008 | Kamiya | G06T 3/0062 382/275 |
| 2010/0111489 A1* | 5/2010 | Presler | H04N 5/225 386/278 |
| 2010/0149361 A1* | 6/2010 | Takeuchi | H04N 5/2353 348/222.1 |
| 2010/0174751 A1* | 7/2010 | Kawano | G06F 21/6218 707/784 |
| 2013/0002619 A1* | 1/2013 | Ukawa | G09G 5/003 345/204 |
| 2013/0326018 A1* | 12/2013 | Ryu | H04L 67/10 709/217 |
| 2014/0161314 A1* | 6/2014 | Ostrovsky-Berman | G06F 17/30864 382/103 |
| 2014/0185068 A1* | 7/2014 | Kishi | H04N 1/6033 358/1.9 |
| 2015/0120461 A1* | 4/2015 | Miyata | G06K 7/00 705/14.64 |
| 2016/0026853 A1* | 1/2016 | Wexler | H04N 5/2257 382/103 |

* cited by examiner

[Fig. 1]
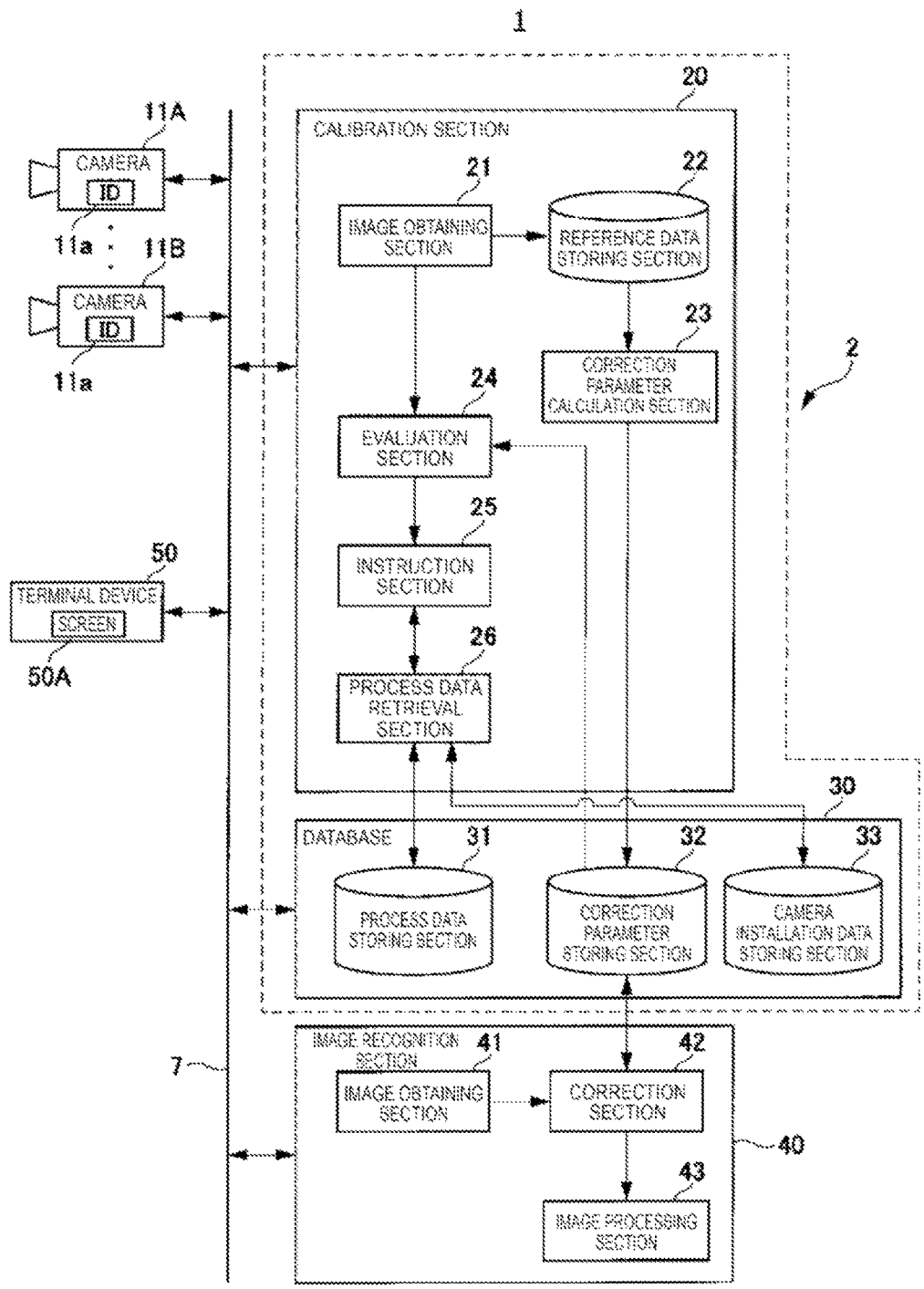

[Fig. 2]
| ID NUMBER | BASELINE LENGTH | FOCAL LENGTH | CHART SIZE | DISTANCE | PHOTOGRAPHING POSITION | SHIPPING REFERENCE IMAGE |
|---|---|---|---|---|---|---|
| 1 | D1 | f1 | a1cm | b1cm | (c1,d1),.... | PRESENCE |
| 2 | D2 | f2 | a2cm | b2cm | (c2,d2),.... | ABSENCE |
| ... | ... | ... | ... | ... | ... | ... |
[Fig. 3]
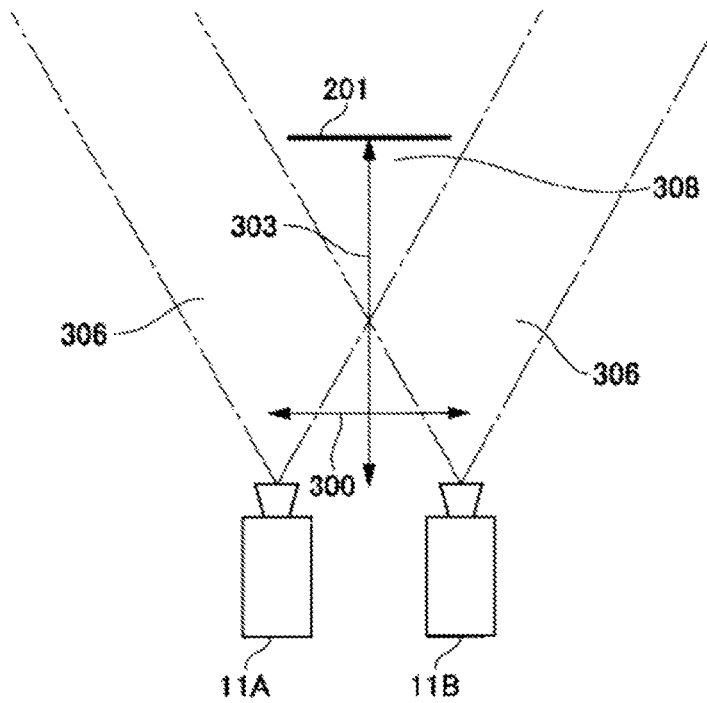

[Fig. 4]
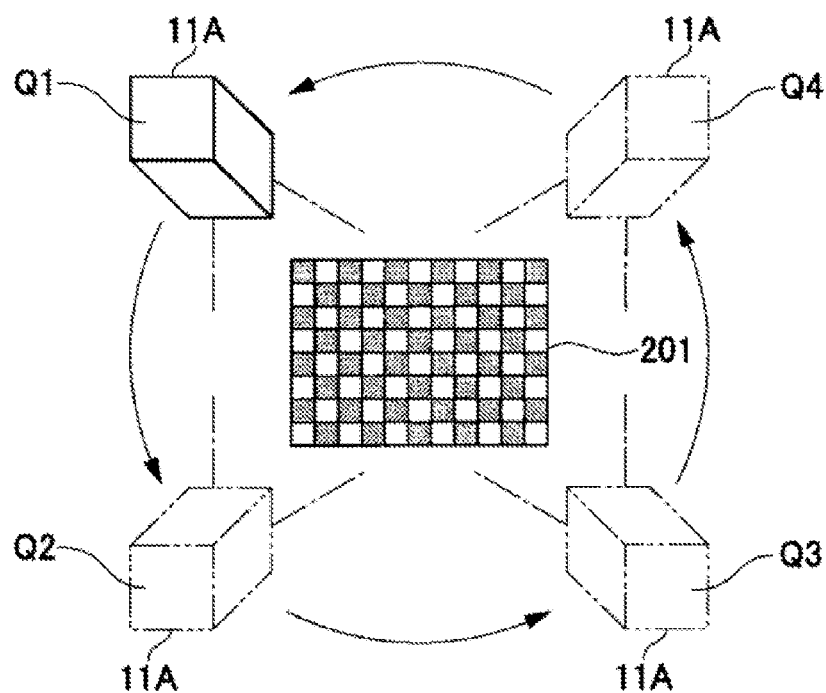
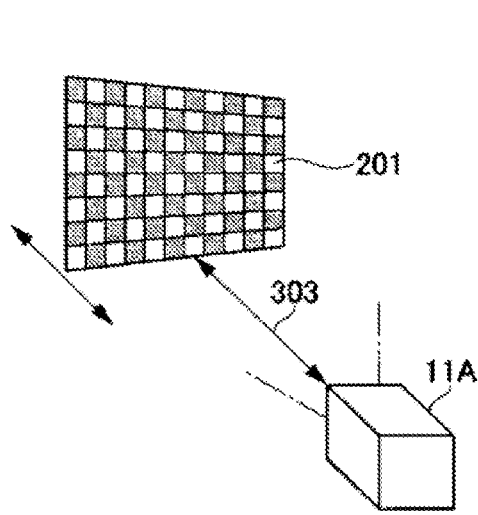
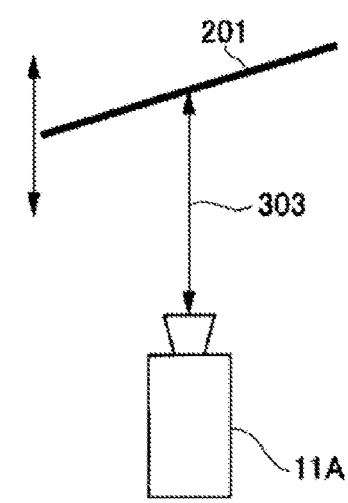
Fig. 5A Fig. 5B

[Fig. 6]
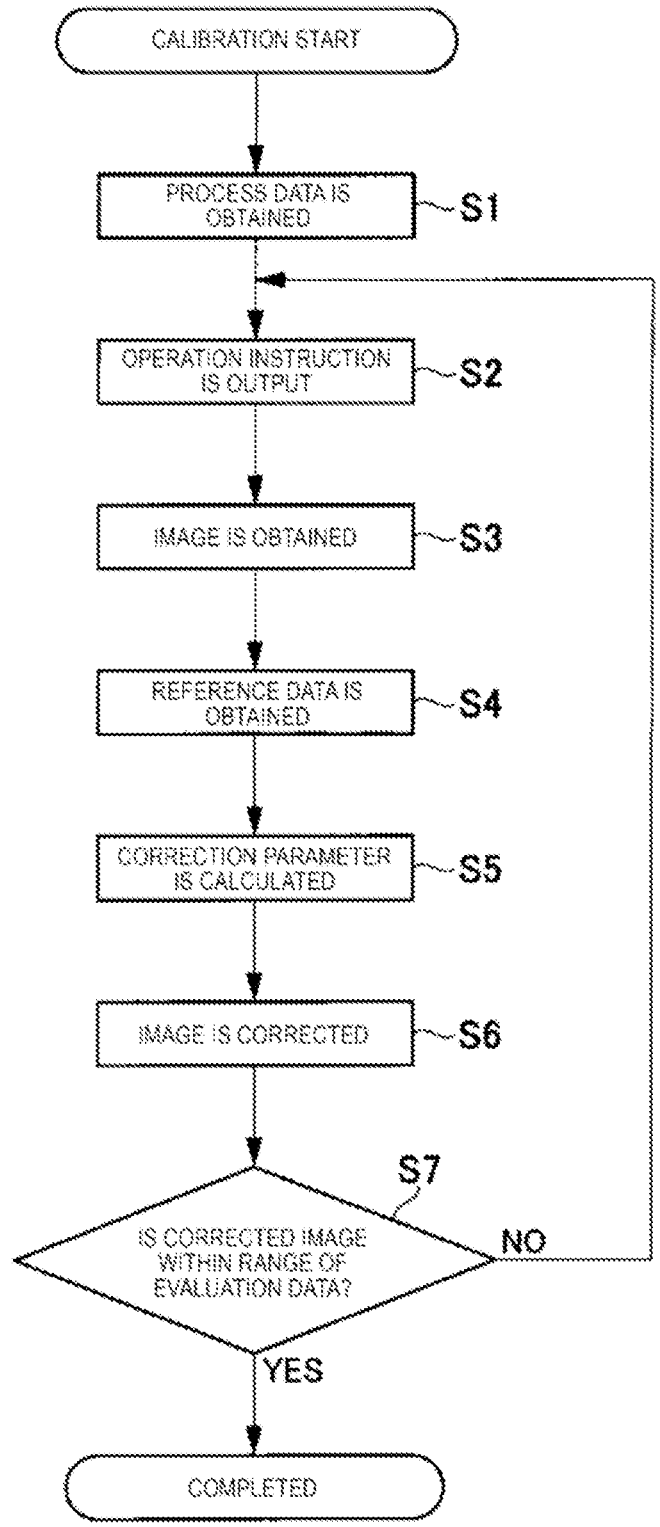

[Fig. 7]
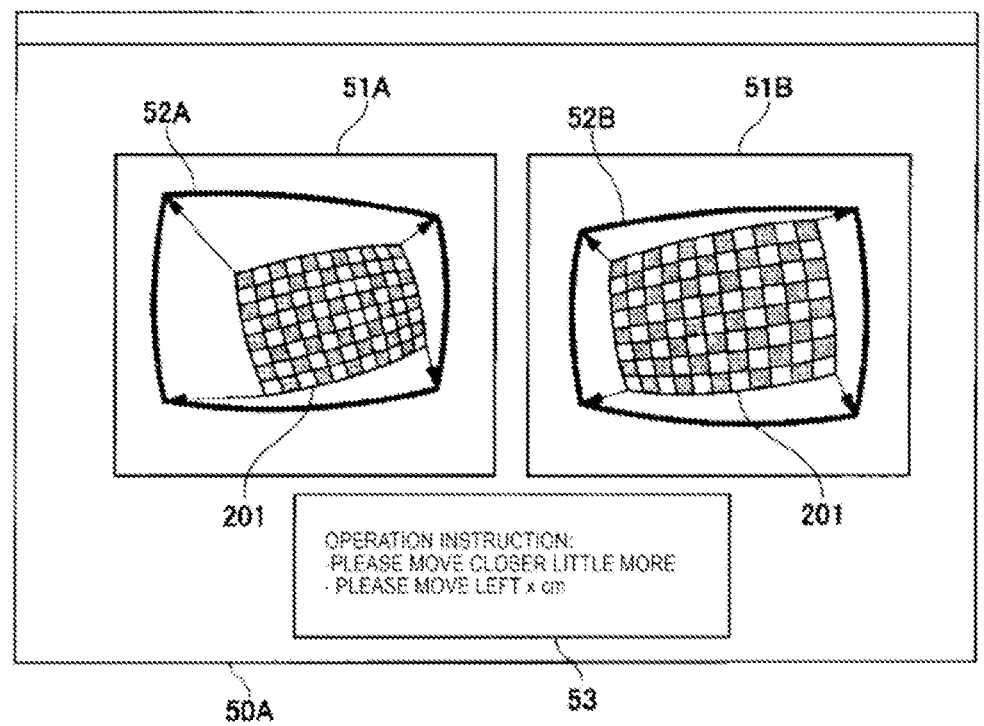
[Fig. 8]
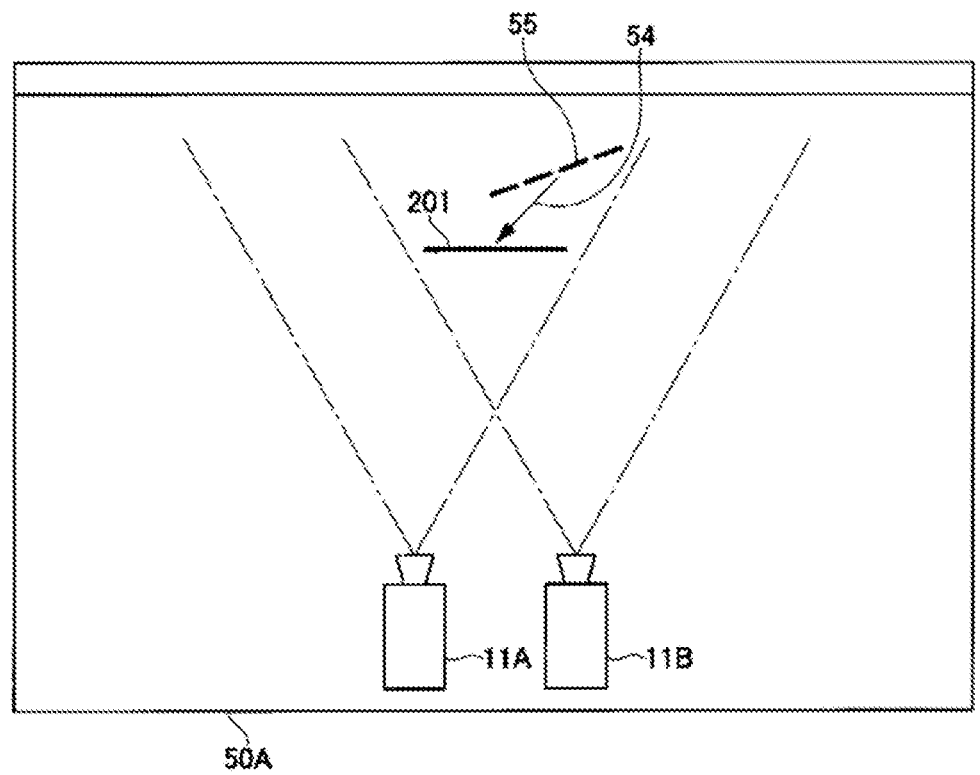

[Fig. 9]
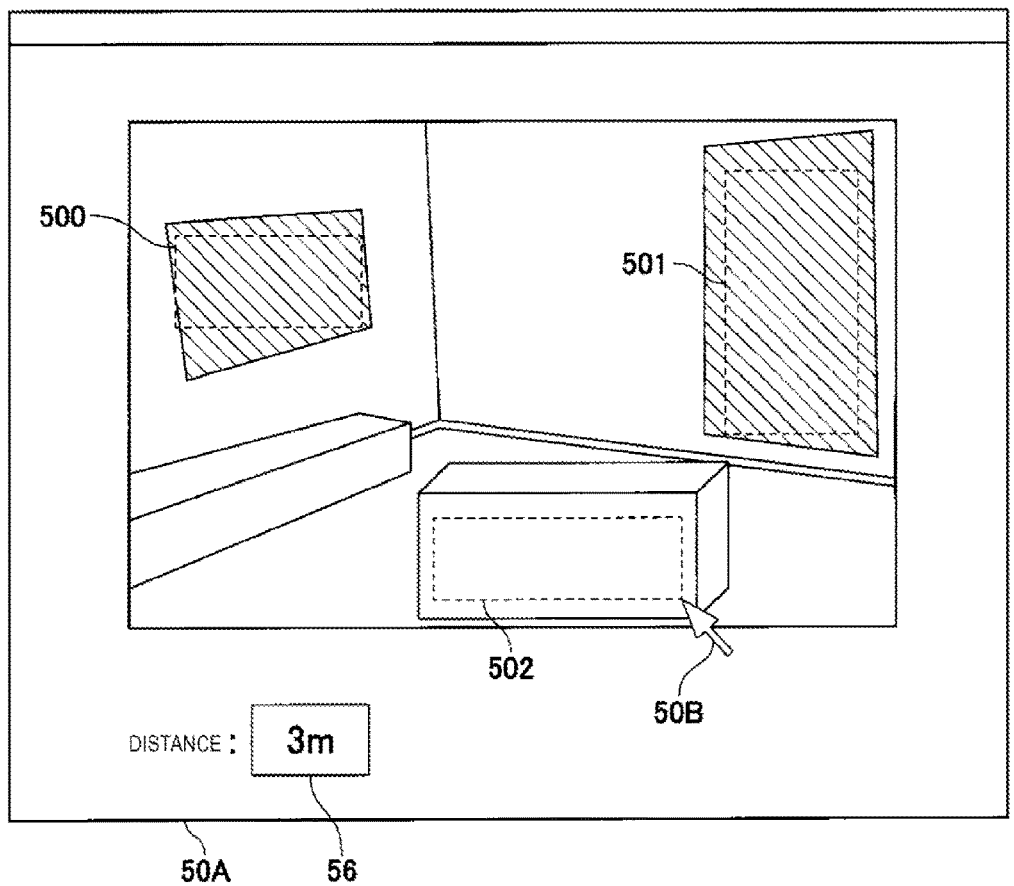
[Fig. 10]
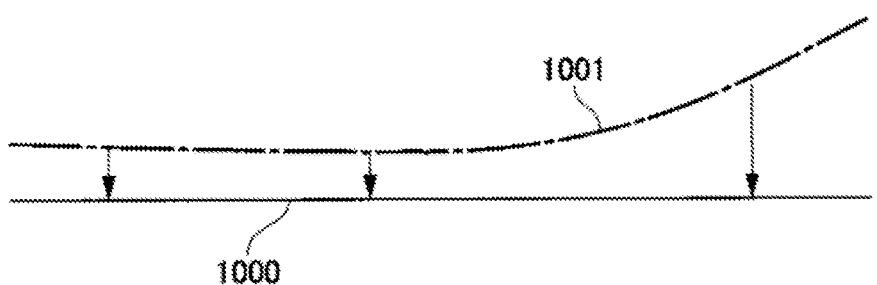

[Fig. 11]
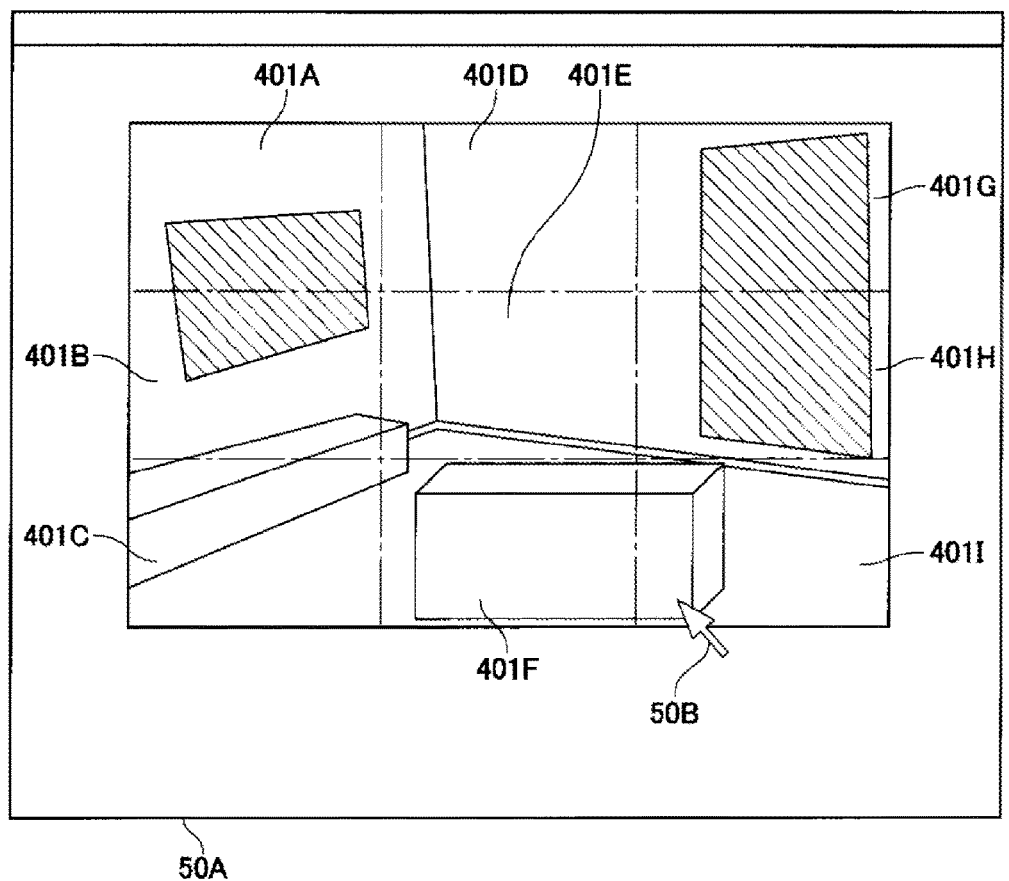

CALIBRATION DEVICE OF CAMERA, CAMERA SYSTEM, AND CALIBRATION METHOD OF CAMERA

TECHNICAL FIELD

The present invention relates to a calibration device of a camera for obtaining camera parameters of a camera such as a monitoring camera or a camera sensor, a camera system having the calibration device, and a calibration method of a camera.

BACKGROUND ART

Conventionally, if distortion of an image of a monitoring camera, a camera sensor, and the like is corrected or in order to realize image recognition by a plurality of cameras such as stereo cameras, the camera parameters, which are camera information indicating a focal length and orientation of the camera, and the like, are estimated.

It is conceivable that deviation occurs in the camera parameters when manufacturing the camera and when installing the camera on-site. The camera parameters are changed because distortion occurs in a housing due to pressure in a contact surface when installing the camera or a housing material of the camera is expanded or contracted by temperature, humidity, and the like. In addition, in the camera parameters, errors also occur over a long period of time by vibration and the like. Therefore, in the related art, calibration (correction) of the camera is performed based on estimated camera parameters.

For example, a technique, which obtains data for calibration of a camera by using a plurality of chart photographing images in which optical conditions of the camera photographing a chart for calibration with marks by changing the optical conditions, is described in PTL 1.

CITATION LIST

Patent Literature

PTL 1: JP-A-2004-37270

SUMMARY OF INVENTION

Technical Problem

However, if calibration is performed in a position in which the camera is installed, unlike factories manufacturing the camera, since equipment for performing the calibration is not always necessarily present in the position in which the camera is installed, an operation may become very complicated.

In addition, the operation of calibration of a position in which a reference chart is photographed, a size and the like is different for every specification of a focal length of the installed camera, a baseline length, and the like. Therefore, an operator must select an operation of calibration in accordance with the specifications of the camera and the calibration operation is very complicated. As a result, variation occurs in the camera parameters estimated by the operator and there is a problem that accuracy of the calibration decreases.

The invention is made in view of the problem described above and an object of the invention is to provide a calibration device of a camera, a camera system, and a calibration method of a camera which can simplify a calibration operation and achieve improvement of accuracy of the calibration.

Solution to Problem

In order to solve the problem described above and to achieve the object of the invention, a calibration device of a camera of the invention includes a database, an instruction section, a correction section, and an evaluation section. The database stores process data that is an operation step of calibration in accordance with a specification of the camera. The instruction section outputs an operation instruction to a display screen based on the process data stored in the database. The correction section corrects reference data obtained based on the process data from image data photographed by the camera. The evaluation section evaluates a correction image corrected by the correction section.

In addition, a camera system of the invention includes a camera that photographs an image; and a calibration device that performs calibration of the camera. For the calibration device, the calibration device described above is used.

Furthermore, a calibration method of a camera of the invention includes the following steps indicated in from (1) to (4).

(1) A step of obtaining process data that is an operation step of calibration from a database in accordance with a specification of the camera;

(2) A step of outputting an operation instruction to a display screen by an instruction section based on the obtained process data;

(3) A step of correcting reference data obtained based on the process data from image data photographed by the camera by a correction section; and (4) A step of evaluating a correction image corrected by the correction section by an evaluation section.

Advantageous Effects of Invention

According to the calibration device of a camera, the camera system, and the calibration method of a camera of the invention, it is possible to achieve simplification of the calibration operation and improvement of accuracy of the calibration.

BRIEF DESCRIPTION OF DRAWINGS

FIG. 1 is a block diagram illustrating an entire configuration of a camera system according to an example of the invention.

FIG. 2 is an explanatory view illustrating an example of a table of process data in a camera system according to a first example of the invention.

FIG. 3 is a schematic view describing details of the process data in the camera system according to the first example of the invention.

FIG. 4 is an explanatory view illustrating details of a photographing position in the camera system according to the first example of the invention.

FIGS. 5A and 5B are explanatory views illustrating details of the photographing position in the camera system according to the first example of the invention.

FIG. 6 is a flowchart illustrating a calibration operation in the camera system according to the first example of the invention.

FIG. 7 is an explanatory view illustrating a display example of an instruction that is output to a display screen by an instruction section in the camera system according to the first example of the invention.

FIG. 8 is an explanatory view illustrating a display example of an instruction that is output to the display screen by the instruction section in the camera system according to the first example of the invention.

FIG. 9 is an explanatory view illustrating a display example of an instruction that is output to a display screen by an instruction section in a camera system according to a second example of the invention.

FIG. 10 is an explanatory view illustrating an example of calibration in the camera system according to the second example of the invention.

FIG. 11 is an explanatory view illustrating a display example of an instruction output to a display screen by an instruction section in a camera system according to a third example of the invention.

DESCRIPTION OF EMBODIMENTS

Hereinafter, examples of a calibration device of a camera, a camera system, and a calibration method of a camera of the invention will be described with reference to FIGS. 1 to 11. Moreover, the same reference numerals are given to common members in each view.

1. First Example 1-1. Configuration Example of Camera System

First, a configuration of a camera system according to a first example (hereinafter, referred to as the "example") of the invention will be described with reference to FIG. 1.

FIG. 1 is a block diagram illustrating an entire configuration of the camera system of the example.

A camera system 1 illustrated in FIG. 1 is a stereo camera for photographing a distance and a three-dimensional image using two cameras. As illustrated in FIG. 1, the camera system 1 has two cameras 11A and 11B, a calibration device 2, an image recognition section 40, and a terminal device 50. The two cameras 11A and 11B, the calibration device 2, the image recognition section 40, and the terminal device 50 are connected via a wireless or wired network 7 (Local Area Network (LAN), Internet, dedicated line, and the like) and are able to transmit and receive data with each other.

ID numbers 11a identifying specifications of cameras are respectively provided in the two cameras 11A and 11B. Image data photographed by the two cameras 11A and 11B and the ID numbers 11a are transmitted to the calibration device 2, the image recognition section 40, and the terminal device 50 via the network 7.

The calibration device 2 has a calibration section 20 and a database 30 in which various types of data are stored. The calibration section 20 has an image obtaining section 21, a reference data storing section 22, a correction parameter calculation section 23, an evaluation section 24, an instruction section 25, and a process data retrieval section 26.

The image obtaining section 21 obtains the image data photographed by the cameras 11A and 11B when performing calibration. Then, the image obtaining section 21 extracts reference data that is used during a calibration operation from obtained image data and outputs the reference data to the reference data storing section 22. In addition, the image obtaining section 21 outputs the obtained image data to the evaluation section 24.

The reference data output from the image obtaining section 21 is stored in the reference data storing section 22. Moreover, in the example, an example in which the image obtaining section 21 extracts the reference data from the image data, is described, but the invention is not limited to the example. For example, the image data is output from the image obtaining section 21 to the reference data storing section 22 and the reference data is extracted from the image data output by the reference data storing section 22 and may be stored in the reference data storing section 22. Furthermore, a reference data obtaining section extracting the reference data from the image data obtained by the image obtaining section 21 may be separately provided.

The reference data storing section 22 is connected to the correction parameter calculation section 23. The correction parameter calculation section 23 calculates correction parameters based on the reference data stored in the reference data storing section 22.

The correction parameter calculation section 23 outputs calculated correction parameters to a correction parameter storing section 32 of the database 30 described below.

The image data obtained by the image obtaining section 21 and the correction parameters calculated by the correction parameter calculation section 23 and stored in the correction parameter storing section 32 are output to the evaluation section 24. The evaluation section 24 generates an evaluation correction image using the image data and the correction parameters. In addition, evaluation data for evaluating the correction image is stored in the evaluation section 24. Then, the evaluation section 24 evaluates a generated evaluation correction image based on the evaluation data. The evaluation section 24 outputs information that is evaluated to the instruction section 25.

Moreover, in the example, an example in which the evaluation section 24 generates the evaluation correction image is described, but the invention is not limited to the example. For example, a correction section generating the evaluation correction image based on the correction parameters and the image data may be provided in the calibration section 20 or a correction image generated by a correction section 42 of the image recognition section 40 described below may be used.

The instruction section 25 receives information evaluated by the evaluation section 24 or the process data retrieved by the process data retrieval section 26 described below. Then, the instruction section 25 outputs the received information to the terminal device 50.

The process data retrieval section 26 is connected to a process data storing section 31 and a camera installation data storing section 33 of the database 30 described below. The process data retrieval section 26 retrieves and obtains the process data for performing the calibration from the process data storing section 31 and the camera installation data storing section 33 based on the ID numbers 11a of the cameras 11A and 11B. Then, the process data retrieval section 26 outputs the obtained process data to the instruction section 25.

Next, the database 30 will be described. The database 30 has the process data storing section 31, the correction parameter storing section 32, and the camera installation data storing section 33.

Operation data for performing the operation of the calibration is stored in the process data storing section 31 for each specification of the camera. In addition, camera installation data indicating a coordinate position, a camera orientation, and the like for installing the cameras 11A and 11B is stored in the camera installation data storing section 33. Then, the process data that is an operation step for performing the operation of the calibration is configured of the operation data and the camera installation data.

FIG. 2 is an explanatory view illustrating an example of a table of the process data stored in the process data storing section 31 and the camera installation data storing section 33. FIG. 3 is a schematic view describing details of the process data.

As illustrated in FIG. 2, in the process data, a chart size 302, a distance 303, a photographing position 304, and a presence or absence of shipping reference image 305 are set based on, for example, the ID number 11a, a baseline length 300, and a focal length 301 of the cameras 11A and 11B.

As illustrated in FIG. 3, the baseline length 300 indicates a distance between lenses in the two cameras 11A and 11B. In addition, the focal length 301 is a distance from a principal point to the focal point of the lens of the camera 11A, that is, a distance from the lens to an imaging element when the focus is adjusted. Thus, the focal length 301 corresponds to a field angle 306 that is an angle of a range of a scene to be photographed in an image photographed by the cameras 11A and 11B illustrated in FIG. 3. For example, as the focal length 301 becomes shorter, the field angle 306 becomes wider and as the focal length 301 becomes longer, the field angle 306 becomes narrower.

The distance 303 in the process data indicates a distance between the cameras 11A and 11B, and a reference chart 201 photographed by the cameras 11A and 11B when performing the calibration.

In addition, the chart size 302 indicates a size of the reference chart 201 photographed by the cameras 11A and 11B when performing the calibration. The chart size 302 of a range, which fits in a common field 308 of the two cameras 11A and 11B in the distance 303, is set if the field angle 306 and the baseline length 300 of the cameras 11A and 11B are determined.

Next, details of the photographing position 304 indicated in the process data will be described with reference to FIGS. 4 and 5.

FIGS. 4 and 5 are explanatory views describing the details of the photographing position.

The photographing position 304, for example, as illustrated in FIG. 4, fixes the reference chart 201, moves the camera 11A, and sets a position in which the reference data is obtained. In the example illustrated in FIG. 4, an example, in which the reference chart 201 is photographed from four directions of four points Q1, Q2, Q3, and Q4, is illustrated.

In addition, the photographing positions 304 are appropriately set by correction accuracy required by the calibration and are preferably set to be equal to or greater than five positions of four upper, lower, right, and left positions, and a front with respect to the reference chart 201.

Moreover, in the example illustrated in FIG. 4, an example in which the camera 11A is moved is described, but the invention is not limited to the example. For example, if the camera 11A is fixed, as illustrated in FIGS. 5A and 5B, the reference chart 201 may be moved with respect to the camera 11A. In this case, an operation is performed by setting the distance between the camera 11A and the reference chart 201 as a distance that is set by the distance 303.

The presence or absence of shipping reference image 305 sets whether or not an image (hereinafter, referred to as "shipping reference image") in which the reference chart 201 is photographed under the same conditions as those during the operation of the calibration is present when shipping the cameras 11A and 11B. If the shipping reference image indicating an example of an initial reference image is present, it is possible to estimate displacement of camera parameters by comparing the shipping reference image to the image data photographed during the calibration operation, so-called reference data.

In addition, when the evaluation section 24 evaluates the correction parameters, the evaluation may be performed using the shipping reference image.

Then, for a plurality of types of process data for each specification of the camera described above, the process data is retrieved in accordance with a camera in which the calibration is performed by the process data retrieval section 26 of the calibration section 20. Then, the retrieved process data is output to the instruction section 25 via the process data retrieval section 26.

The correction parameters calculated by the correction parameter calculation section 23 are stored in the correction parameter storing section 32. The correction parameter storing section 32 outputs the stored correction parameters to the evaluation section 24 or the correction section 42 of the image recognition section 40 described below. In addition, the correction image that is corrected by the image recognition section 40 described above may be output to the correction parameter storing section 32.

The image recognition section 40 has an image obtaining section 41, the correction section 42, and an image processing section 43. The image obtaining section 41 obtains the image data from the two cameras 11A and 11B. The correction section 42 corrects the image data obtained by the image obtaining section 41 based on the correction parameters output from the correction parameter storing section 32 and generates the correction image. The correction section 42 outputs the generated correction image to the correction parameter storing section 32 or the image processing section 43.

The image processing section 43 processes the correction image output from the correction section 42 and calculates a parallax of right and left of the two cameras 11A and 11B. Moreover, in the example, the process of the stereo camera is described in the image processing section 43, but the invention is not limited to the example. The image processing section 43 may process, for example, an image for the three-dimensional image from the correction image output from the correction section 42.

The terminal device 50 is a display device having, for example, a display screen 50A formed of a liquid crystal display screen, a Cathode Ray Tube (CRT) display screen, and the like and an input section. Images photographed by the cameras 11A and 11B, and instruction information output from the instruction section 25 are displayed in the display screen 50A. Moreover, details of the instruction information displayed in the display screen 50A of the terminal device 50 will be described later.

Moreover, in the camera system 1 of the example, the two cameras 11A and 11B and the calibration section 20, the database 30, the image recognition section 40, and the terminal device 50 are connected via the network 7, and are respectively described as separate configurations, but the invention is not limited to the example. For example, the calibration section 20, the database 30, the image recognition section 40, and the terminal device 50 may be built into the camera 11A.

In addition, instead of providing the terminal device 50, a configuration, in which a Red Green Blue monitor output and a data output via a network are performed to a liquid crystal display device and a CRT display device of an external apparatus such as a personal computer (PC), may be provided.

1-2. Calibration Method of Camera

Next, a calibration method of the cameras 11A and 11B in the camera system 1 of the example will be described with reference to FIGS. 6 to 8.

FIG. 6 is a flowchart illustrating the calibration operation.

First, as illustrated in FIG. 6, the calibration section 20 obtains the process data for performing the calibration operation from the database 30 (step S1). Specifically, first, the calibration section 20 obtains the ID numbers 11a identifying the specification of the camera from the cameras 11A and 11B. Then, the process data retrieval section 26 retrieves the process data from the process data storing section 31 and the camera installation data storing section 33 based on the obtained ID number 11a and obtains the process data.

Next, the process data retrieval section 26 outputs the obtained process data to the instruction section 25. Then, the instruction section 25 outputs the operation instruction to the display screen 50A of the terminal device 50 based on the output process data (step S2). For example, the instruction section 25 outputs the table of the process data illustrated in FIG. 2 to the display screen 50A of the terminal device 50.

Thus, an operator can easily determine operation contents for performing the calibration and achieve simplification of the calibration operation.

In addition, the instruction section 25 may output the operation instruction to the terminal device 50 based on the image data obtained in step S3 described below.

Here, an example of instruction contents displayed in the display screen 50A will be described with reference to FIGS. 7 and 8.

FIGS. 7 and 8 are views illustrating a display example of the instruction output to the display screen 50A by the instruction section.

As illustrated in FIG. 7, a first display section 51A in which an image photographed by the camera 11A is displayed and a second display section 51B in which an image photographed by the camera 11B is displayed are provided in the display screen 50A. Moreover, the terminal device 50 has an image obtaining section for obtaining the image data photographed by the cameras 11A and 11B. A first guide 52A is displayed in the first display section 51A and a second guide 52B is displayed in the second display section 51B. The first guide 52A and the second guide 52B are appropriately changed based on the process data.

Furthermore, an operation instruction window 53 displaying the operation contents with respect to the operator is displayed in the display screen 50A.

The operator moves the reference chart 201 or the cameras 11A and 11B so that frames of the first guide 52A and the second guide 52B displayed in the display screen 50A and an outer edge of the reference chart 201 are fitted with each other. In addition, the instruction section 25 outputs the operation instruction to the operation instruction window 53 in accordance with the positions of the reference chart 201 displayed in the first display section 51A and the second display section 51B.

The instruction section 25 measures distances between four corners of the reference charts 201 displayed in the first display section 51A and the second display section 51B and four corners of the first guide 52A and the second guide 52B. Then, the instruction section 25 outputs the operation instruction to the operation instruction window 53 in accordance with a measured distance. Moreover, comparison between the reference charts 201 displayed in the first display section 51A and the second display section 51B, and the first guide 52A and the second guide 52B may be determined so as to minimize errors of lengths of four sides.

Otherwise, as illustrated in FIG. 8, the instruction section 25 calculates positions in a real space in the cameras 11A and 11B, and the reference chart 201 based on the obtained image data, and may output the positions to the display screen 50A. Then, the instruction section 25 displays an arrow 54, a guide 55, and the like on the display screen 50A and may instruct the operator to position the reference chart 201 in a predetermined position.

As described above, the instruction section 25 instructs an operation procedure in the calibration operation so as to be capable of accurately transmitting the operation contents to the operator and it is possible to prevent variation of accuracy of the calibration operation according to the operator. Therefore, it is possible to improve the accuracy of the calibration.

Next, the calibration section 20 obtains the image data photographed by the cameras 11A and 11B using the image obtaining section 21 (step S3). Then, the image obtaining section 21 obtains the reference data necessary for the calibration among a plurality of types of obtained image data (step S4). Moreover, the reference data is the image data that is fitted with conditions of the process data among the plurality of types of image data. Then, the image obtaining section 21 outputs the obtained reference data to the reference data storing section 22.

Next, the correction parameter calculation section 23 calculates the correction parameters based on the reference data stored in the reference data storing section 22 (step S5).

Specifically, first, the correction parameter calculation section 23 estimates a camera parameter C formed of an internal parameter K and an external parameter D of the cameras 11A and 11B based on the reference data. Then, the correction parameter calculation section 23 calculates a deviation amount between an estimated camera parameter C and the reference parameter that is set in advance. Next, the correction parameter calculation section 23 calculates the correction parameters so that the deviation amount becomes the minimum value or 0. Moreover, the calculation of the correction parameters is calculated by repeating the calculation process a predetermined number of times.

Here, the camera parameter C will be described.

First, the internal parameter K is represented by a matrix illustrated in the following Equation 1. In Equation 1, f indicates a focal length, a indicates an aspect ratio, s indicates skew indicating distortion of an image, and ($v_c$ and $u_c$) indicate center coordinates of coordinates (image coordinates) within images photographed by the cameras 11A and 11B.

$$K = \begin{bmatrix} f & sf & v_c & 0 \\ 0 & af & u_c & 0 \\ 0 & 0 & 1 & 0 \end{bmatrix}$$ [Equation 1]

In addition, the external parameter D is represented by a matrix illustrated in the following Equation 2. In Equation 2, ($r_{11}$, $r_{12}$, $r_{13}$, $r_{21}$, $r_{22}$, $r_{23}$, $r_{31}$, $r_{32}$, and $r_{33}$) indicate the orientations of the cameras 11A and 11B. In addition, in Equation 2, ($t_X$, $t_Y$, and $t_Z$) indicate coordinates of the positions in which the cameras 11A and 11B are installed, so-called world coordinates.

$$D = \begin{bmatrix} r_{11} & r_{12} & r_{13} & t_X \\ r_{21} & r_{22} & r_{23} & t_Y \\ r_{31} & r_{32} & r_{33} & t_Z \\ 0 & 0 & 0 & 1 \end{bmatrix}$$ [Equation 2]

Then, image coordinates (u, v) and the world coordinates ($X_W$, $Y_W$, $Z_W$) can be represented by a relational expression illustrated in the following Equation 3 using the internal parameter K and the external parameter D. Moreover, in Equation 3, λ indicates a constant.

$$\lambda \begin{bmatrix} u \\ v \\ 1 \end{bmatrix} = KD \begin{bmatrix} X_w \\ Y_w \\ Z_w \\ 1 \end{bmatrix} \quad \text{[Equation 3]}$$

Moreover, when ($r_{11}$, $r_{12}$, $r_{13}$, $r_{21}$, $r_{22}$, $r_{23}$, $r_{31}$, $r_{32}$, and $r_{33}$) representing the orientations of the cameras 11A and 11B in the external parameter D are defined by Euler angles, they are represented by three parameters of a pan θ, a tilt ϕ, and a roll ψ that are installation angles of the cameras 11A and 11B. Thus, the number of camera parameters necessary for associating the image coordinates and the world coordinates becomes eleven that is a sum of five internal parameters and six external parameters.

In addition, it can be seen that the matrix of the camera parameter C in Equation 3 is unchanged in its meaning even if the matrix is constant multiplication. Thus, the constant λ, the internal parameter K, and the external parameter D are organized in one matrix and can be represented as illustrated in the following Equation 4.

$$\begin{bmatrix} u \\ v \\ 1 \end{bmatrix} = \begin{bmatrix} c_{11} & c_{12} & c_{13} & c_{14} \\ c_{21} & c_{22} & c_{23} & c_{24} \\ c_{31} & c_{32} & c_{33} & c_{34} \end{bmatrix} \begin{bmatrix} X_w \\ Y_w \\ Z_w \\ 1 \end{bmatrix} \quad \text{[Equation 4]}$$

Furthermore, in Equation 4, when $c_{34}=1$, the number of unknown parameters is eleven. Then, determining values of eleven parameters is synonymous with determining five internal parameters and six external parameters in Equation 3. Therefore, Equation 3 can be converted into the following Equation 5. Then, a matrix C in Equation 5 becomes the camera parameter C.

$$\begin{bmatrix} u \\ v \\ 1 \end{bmatrix} = C \begin{bmatrix} X_w \\ Y_w \\ Z_w \\ 1 \end{bmatrix} \quad \left( C = \begin{bmatrix} c_{11} & c_{12} & c_{13} & c_{14} \\ c_{21} & c_{22} & c_{23} & c_{24} \\ c_{31} & c_{32} & c_{33} & 1 \end{bmatrix} \right) \quad \text{[Equation 5]}$$

Moreover, the correction parameter calculated by the correction parameter calculation section 23 may be the camera parameter C illustrated in Equation 5 or may be only the internal parameter K illustrated in Equation 1.

Next, the correction parameter calculation section 23 stores the calculated correction parameter in the correction parameter storing section 32. Then, the evaluation section 24 or the correction section 42 corrects the image data based on the stored correction parameter (step S6). In the correction process in step S6, a process is selected in accordance with application of the camera system 1.

Next, the evaluation section 24 evaluates the evaluation correction image based on the evaluation data that is stored in advance. That is, the evaluation section 24 performs determination on whether or not the correction image is within a range of the evaluation data (step S7). As an evaluation method performed by the evaluation section 24, for example, distance data calculated from the correction image and an actual measurement value are compared or deviation between the shipping reference image and the correction image are evaluated in a case in which the shipping reference image is present.

Otherwise, the evaluation section 24 detects the number E of edge points in an evaluation table correction image and calculates a parallax density D from an effective number d of parallaxes. The parallax density D is calculated from the following Expression 1.

$$D=d/E \quad \text{[Expression 1]}$$

Expression 1 represents the effective number of parallaxes with respect to the number of edge points and may be used as an evaluation value for the accuracy of the correction parameter and for whether it is parallel in stereo processing. Then, the evaluation section 24 may perform evaluation of the correction image by determining whether or not the calculated parallax density D is within a range of a threshold value.

In the process of step S7, if the evaluation section 24 determines that the correction image is within the range of the evaluation data (YES determination of step S7), the evaluation section 24 outputs an evaluation result to the instruction section 25. Then, the calibration section 20 stores the evaluated correction parameter in the correction parameter storing section 32. Therefore, the calibration operation is completed.

In addition, in the process of step S7, if the evaluation section 24 determines that the correction image is not within the range of the evaluation data (NO determination of step S7), the evaluation section 24 outputs the evaluation result to the instruction section 25. Then, the calibration section 20 performs the calibration operation again by returning to the process of step S2.

As described above, in the camera system 1 of the example, it is possible to determine the correction parameter by the evaluation section 24 by evaluating the calculated correction parameter by the evaluation section 24 even if the accuracy of the calibration is reduced. Then, information evaluated by the evaluation section 24 is output via the instruction section 25. As a result, the operator can quickly recognize that the accuracy of the calibration is reduced and improve the accuracy of the calibration.

In addition, if the calibration operation is incorrect, it can be detected by the evaluation section 24.

Moreover, in the example, an example in which the calibration section 20 obtains the ID numbers 11a provided in the cameras 11A and 11B is described, but the invention is not limited to the example. For example, when performing the calibration operation, the operator inputs identification information of the camera such as the ID numbers of the cameras 11A and 11B, the baseline length, and the focal length into the terminal device 50. Then, the terminal device 50 may transmit the input identification information of the camera to the calibration device 2.

2. Second Example

A camera system according to a second example of the invention will be described with reference to FIG. 9.

FIG. 9 is an explanatory view illustrating instruction contents of an instruction section in the camera system according to the second example.

A difference point of the camera system according to the second example from the camera system 1 according to the first example, is the instruction contents being output to the terminal device 50 by the instruction section 25. Thus, here, contents that are displayed in a display screen 50A of the terminal device 50 will be described and the same reference numerals are given to common portions to the camera system 1 according to the first example and redundant description will be omitted.

Here, in a case in which a distance to the cameras 11A and 11B with respect to a certain object is known in advance, it is possible to obtain an expected value of the parallax of the two cameras 11A and 11B. For example, in a case in which the object is a plane normally facing the cameras 11A and 11B, the parallax is constant. Furthermore, in a case in which the object is disposed to be inclined with respect to the cameras 11A and 11B, it is possible to optimize a result of the calculated parallax by detecting angles of the object and the cameras 11A and 11B.

FIG. 9 is an explanatory view illustrating display contents displayed in the display screen 50A.

As illustrated in FIG. 9, images that are photographed by the two cameras 11A and 11B are displayed in the display screen 50A. In addition, a distance input window 56 into which an actually measured value from the cameras 11A and 11B to a selected object is input is displayed in the display screen 50A.

The instruction section 25 instructs the operator to select so-called planes 500, 501, and 502 of the object which are known in advance via a cursor 50B, in which the distance to the cameras 11A and 11B is known. In addition, the instruction section 25 instructs the operator to input the distance from the cameras 11A and 11B to the selected planes 500, 501, and 502 into the distance input window 56.

Here, a parallax d with respect to a distance Z can be calculated from the following Expression 2. Moreover, B indicates the baseline length and f indicates the focal length.

$$D = B \times f/Z \qquad \text{[Expression 2]}$$

Then, the calibration section 20 performs correction so that the parallax becomes close to the expected value by changing the values of the internal parameter K illustrated in Equation 1 and the camera parameter C illustrated in Equation 5 based on the region and the distance that are input. In addition, the calibration of the parallax is performed by using a bundle adjustment method used in a survey field, that is, by minimizing a square sum of an error.

FIG. 10 is an explanatory view describing an example of the calibration.

In addition, the invention is not limited to the plane and a correction value of the calibration may be obtained by fitting of a straight line and the like so that linear data 1001 obtained in a floor surface, a ceiling surface, and the like becomes ideal linear data 1000.

3. Third Example

Next, a camera system according to a third example of the invention will be described with reference to FIG. 11.

FIG. 11 is an explanatory view illustrating instruction contents of an instruction section in the camera system according to the third example.

A difference point of the camera system according to the third example from the camera system 1 according to the first example, is the instruction contents being output to the terminal device 50 by the instruction section 25 and a range of an evaluation data of the evaluation section 24. Thus, here, contents that are displayed in the display screen 50A of the terminal device 50 will be described and the same reference numerals are given to common portions to the camera system 1 according to the first example and redundant description will be omitted.

As illustrated in FIG. 11, an image photographed by the two cameras 11A and 11B is displayed in the display screen 50A. Then, the image is divided into nine regions 401A, 401B, 401C, 401D, 401E, 401F, 401G, 401H, and 401I.

Then, a value of the evaluation data of the evaluation section 24 is changed for each of the regions 401A, 401B, 401C, 401D, 401E, 401F, 401G, 401H, and 401I. For example, a region through which important people and objects pass is set so that the range of the evaluation data thereof is strict compared to that of other regions.

In addition, the instruction section 25 may prompt the operator to select a region in which an image is evaluated via a cursor 50B.

Therefore, it is also possible to improve performance of only a specific region in the image photographed by the two cameras 11A and 11B.

Moreover, the region to be divided is not limited to nine regions and the image is divided into equal to or less than eight regions or equal to or greater than ten regions, and the region may be set so that the evaluation data of the evaluation section 24 is different.

Moreover, the invention is not limited to the examples described above and illustrated in the drawings, and various modifications can be made without departing from the gist of the invention described in the claims.

In the examples described above, an example, in which the stereo camera having two cameras is applied as the camera system, is described, but the invention is not limited to the example. The camera system can be applied to, for example, a camera system having equal to or greater than three cameras, a monitoring camera formed of one camera, and the like. Furthermore, the camera system can be applied to various other camera systems such as a three-dimensional video camera photographing a three-dimensional image, a vehicle-mounted camera, an objective interpersonal sensing camera for sensing the people and the objects, an automatic driving system, a people flow measurement system, and a video security system.

REFERENCE SIGNS LIST

1 . . . camera system, 2 . . . calibration device, 7 . . . network, 11a . . . ID number, 11A, 11B . . . camera, 20 . . . calibration section, 21 . . . image obtaining section, 22 . . . reference data storing section, 23 . . . correction parameter calculation section, 24 . . . evaluation section, 25 . . . instruction section, 26 . . . process data retrieval section, 30 . . . database, 31 . . . process data storing section, 32 . . . correction parameter storing section, 33 . . . camera installation data storing section, 40 . . . image recognition section, 41 . . . image obtaining section, 42 . . . correction section, 43 . . . image processing section, 50 . . . terminal device, 50A . . . display screen, 53 . . . operation instruction window, 201 . . . reference chart, 300 . . . baseline length, 301 . . . focal length, 306 . . . field angle.

The invention claimed is:

1. A calibration device of a camera in a camera system, comprising:
a plurality of cameras providing image data;
a database storing process data that is stored in association with each of the plurality of cameras including data of a specification of the cameras;
a display screen;
an instruction section that displays at least part of the stored process data on the display screen;
an image obtaining section that obtains the image data of the cameras and extracts reference data from the image data used during the calibration operation, and outputs the reference data to a reference data storing section;

a correction section that calculates correction parameters from the stored reference data and stores the correction parameters to a correction parameter storing section; and an evaluation section that corrects the image data of the cameras based on the stored correction parameters to obtain a correction image, evaluates the correction image to obtain evaluation data and determines whether the evaluation data is within a predetermined range, wherein the calibration operation is completed when the evaluation data is determined to be within the predetermined range.

2. The calibration device of a camera in a camera system according to claim 1,
wherein the instruction section receives an evaluation result output by the evaluation section and outputs an instruction on the display screen when the evaluation data is not within the predetermined range.

3. The calibration device of a camera in a camera system according to claim 1,
wherein the instruction section receives an evaluation result output by the evaluation section and outputs an instruction on the display screen when the evaluation data is not within the predetermined range, and
wherein the output instruction includes a guidance instruction for guiding an operator to position a a reference chart photographed by each of the cameras on the display screen based on the process data.

4. The calibration device of a camera in a camera system according to claim 1,
wherein an initial reference image photographed during initial setting of the cameras is stored as part of the process data, and
wherein the evaluation section evaluates the correction image using the initial reference image.

5. The calibration device of a camera in a camera system according to claim 1,
wherein the correction section evaluates the correction image by selecting a plane of an image photographed by the cameras having a predetermined distance from the cameras and inputting an actual distance to an object of the image from the cameras for comparison with the predetermined distance that.

6. A camera system comprising:
a plurality of cameras that photograph a scene to obtain an image providing image data generated from the same scene for each of the cameras; and
a calibration device that performs calibration of the plurality of cameras,
wherein the calibration device includes
a database storing process data that is stored in association with each of the plurality of cameras including data of a specification of each of the cameras;
a display screen;
an instruction section that displays at least part of the stored process data on the display screen;

an image obtaining section that obtains the image data of the same scene for each of the cameras and extracts reference data from the image data used during the calibration operation, and outputs the reference data to a reference data storing section;

a correction section that calculates correction parameters from the stored reference data and stores the correction parameters to a correction parameter storing section; and an evaluation section that corrects the image data of the cameras based on the stored correction parameters to obtain a correction image for each of the cameras, evaluates the correction image to obtain evaluation data and determines whether the evaluation data is within a predetermined range for each of the cameras, wherein the calibration operation is completed for each of the cameras when the evaluation data is determined to be within the predetermined range.

7. A calibration method of a camera in a camera system having a plurality of cameras that photograph a scene to obtain an image providing image data generated from the same scene for each of the cameras and a calibration device that performs calibration of the plurality of cameras, comprising:

storing process data in a database in association with each of the plurality of cameras including data of a specification of each of the cameras;

displaying at least part of the stored process data on a display screen;

obtaining the image data of the same scene for each of the cameras and extracting reference data from the image data used during the calibration, and storing the reference data;

calculating correction parameters from the stored reference data and storing the correction parameters;

correcting the image data of the cameras based on the stored correction parameters to obtain a correction image for each of the cameras; and evaluating the correction image to obtain evaluation data and determine whether the evaluation data is within a predetermined range for each of the cameras, wherein the calibration is completed for each of the cameras when the evaluation data is determined to be within the predetermined range.

8. The camera system according to claim 6,
wherein the instruction section receives an evaluation result output by the evaluation section and outputs an instruction on the display screen with respect to one of the cameras when the evaluation data is not within the predetermined range, and
wherein the output instruction that is displayed on the display screen includes a guidance instruction referring to a position of a reference chart photographed in the scene by each of the cameras.

* * * * *